United States Patent [19]
Wall et al.

[11] Patent Number: 5,091,619
[45] Date of Patent: Feb. 25, 1992

[54] APPARATUS FOR RESISTANCE BONDING ELECTROMAGNETIC COILS

[75] Inventors: John H. Wall; Edward L. Walter, both of Columbia City, Ind.

[73] Assignee: Dana Corporation, Toledo, Ohio

[21] Appl. No.: 543,706

[22] Filed: Jun. 26, 1990

[51] Int. Cl.⁵ ............... B23K 11/10; B23K 11/28; H05K 9/00
[52] U.S. Cl. ................... 219/56.1; 174/35 R; 219/89; 219/243
[58] Field of Search ........... 174/35 R, 35 GC, 35 CE; 219/243, 56, 56.1, 56.22, 58, 78.01, 86.8, 89; 228/44.3, 44.7; 156/365, 379.6, 380.2, 380.6, 381

[56] References Cited
U.S. PATENT DOCUMENTS

| | | | |
|---|---|---|---|
| 2,632,211 | 3/1953 | Trigg | 264/27 |
| 2,646,535 | 7/1953 | Coggeshall et al. | 336/205 |
| 2,656,290 | 10/1953 | Berberich et al. | 156/185 |
| 3,307,012 | 2/1967 | Ryan et al. | 219/56 |
| 3,840,722 | 10/1974 | Mayer et al. | 219/243 |
| 4,370,512 | 1/1983 | Thomas | 174/35 CE |

Primary Examiner—Geoffrey S. Evans

[57] ABSTRACT

An apparatus for passing an electrical current through an electromagnetic coil to perform a resistance bonding operation is disclosed. The apparatus includes a pair of pistons which are selectively moved to clamp the leads of the coil to respective electrical terminals. The terminals are selectively connected through a switch to a source of electrical power to perform the resistance bonding operation. A pivotable cover is provided for covering the entire apparatus during the resistance bonding operation. When the cover is closed by an operator, a logic controller automatically actuates the pistons to clamp the leads of the coil to the terminals. Additional limit switches sense when the pistons have been so moved and, in response thereto, automatically close the switch to connect the electrical power supply to the terminals, thereby commencing the resistance bonding operation. The cover may be lined with a shielding material to prevent the operator from being exposed to the electromagnetic field generated by the coil during the resistance bonding operation.

21 Claims, 4 Drawing Sheets

APPARATUS FOR RESISTANCE BONDING ELECTROMAGNETIC COILS

BACKGROUND OF THE INVENTION

This invention relates in general to devices used in the manufacture of electromagnetic coils and in particular to an improved apparatus for passing an electrical current through a wound electromagnetic coil so as to perform a resistance bonding operation.

The electromagnetic coil is a well known device which is adapted to generate a magnetic field when an electrical current is passed therethrough. Such coils are typically formed by winding an insulated copper wire about a central form. The central form may be a core formed from iron or a similar electrically conductive material, or it may be a spool formed from plastic or a similar non-conductive material. In both of these types of coils, the central form becomes an integral part of the finished coil. In other coils, however, the wire is wound about a mandrel which is subsequently removed. Thus, a free standing coil having a central opening is provided.

Regardless of whether the coil is provided with an integral conductive core or non-conductive spool, or whether it is free standing, it is often desirable to subject the coil to a resistance bonding operation. The resistance bonding operation increases the strength and rigidity of the coil and prevents the wire from unwinding. As mentioned above, the wire is covered by an electrical insulating material. However, in wire used for resistance bonded coils, the electrical insulating material is itself covered by a coating of a bonding material. The resistance bonding operation is designed to increase the temperature of the bonding material such that the adjacent windings of the wire are bonded together. To accomplish this, the ends of the wound wire are connected to a source of electrical power so that electrical current passes therethrough. The resistance of the wire to the passage of this current generates heat in the wire. The heat melts the coating of the bonding material on the wire without affecting the integrity of the insulating material.

In the past, the resistance bonding operation has been performed by an operator on an open fixture. The operator manually clamped the ends of the wire to respective terminals, then closed a pair of hand switches (spaced apart from the fixture for safety) so as to connect the terminals to the source of electrical power. Normally, the resistance bonding operation lasts only for a few seconds. However, during that period of time, an electromagnetic field is generated by the coil. The operator, who is located relatively close to the coil during the resistance bonding operation, is thus exposed to this electromagnetic field. Although such exposure is not known to create any health hazards for the operator, it would be desirable to provide an improved fixture which reduces or eliminates this exposure, and which permits the resistance bonding operation to be performed more quickly and reliably.

SUMMARY OF THE INVENTION

This invention relates to an improved apparatus for passing an electrical current through an electromagnetic coil so as to perform a resistance bonding operation. The apparatus includes a pair of pneumatically actuated pistons which are selectively moved so as to clamp the leads of the coil to respective electrical terminals. The terminals are selectively connected through a switch to a source of electrical power to perform a resistance bonding operation. A pivotable cover is provided for covering the entire apparatus, including the coil, during the resistance bonding operation. When the cover is closed by an operator, a logic controller automatically actuates the pistons to clamp the leads of the coil to the terminals. Additional limit switches sense when the pistons have been so moved and, in response thereto, automatically close the switch to connect the electrical power supply to the terminals, thereby commencing the resistance bonding operation. The cover may be lined with a shielding material to prevent the operator from being exposed to the electromagnetic field generated by the coil during the resistance bonding operation.

It is an object of this invention to provide an improved apparatus for performing a resistance bonding operation on an electromagnetic coil.

It is another object of this invention to provide such an apparatus which reduces or eliminates exposure of an operator to an electromagnetic field generated during the resistance bonding operation.

It is a further object of this invention to provide such an apparatus which permits the resistance bonding operation to be performed quickly and easily.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
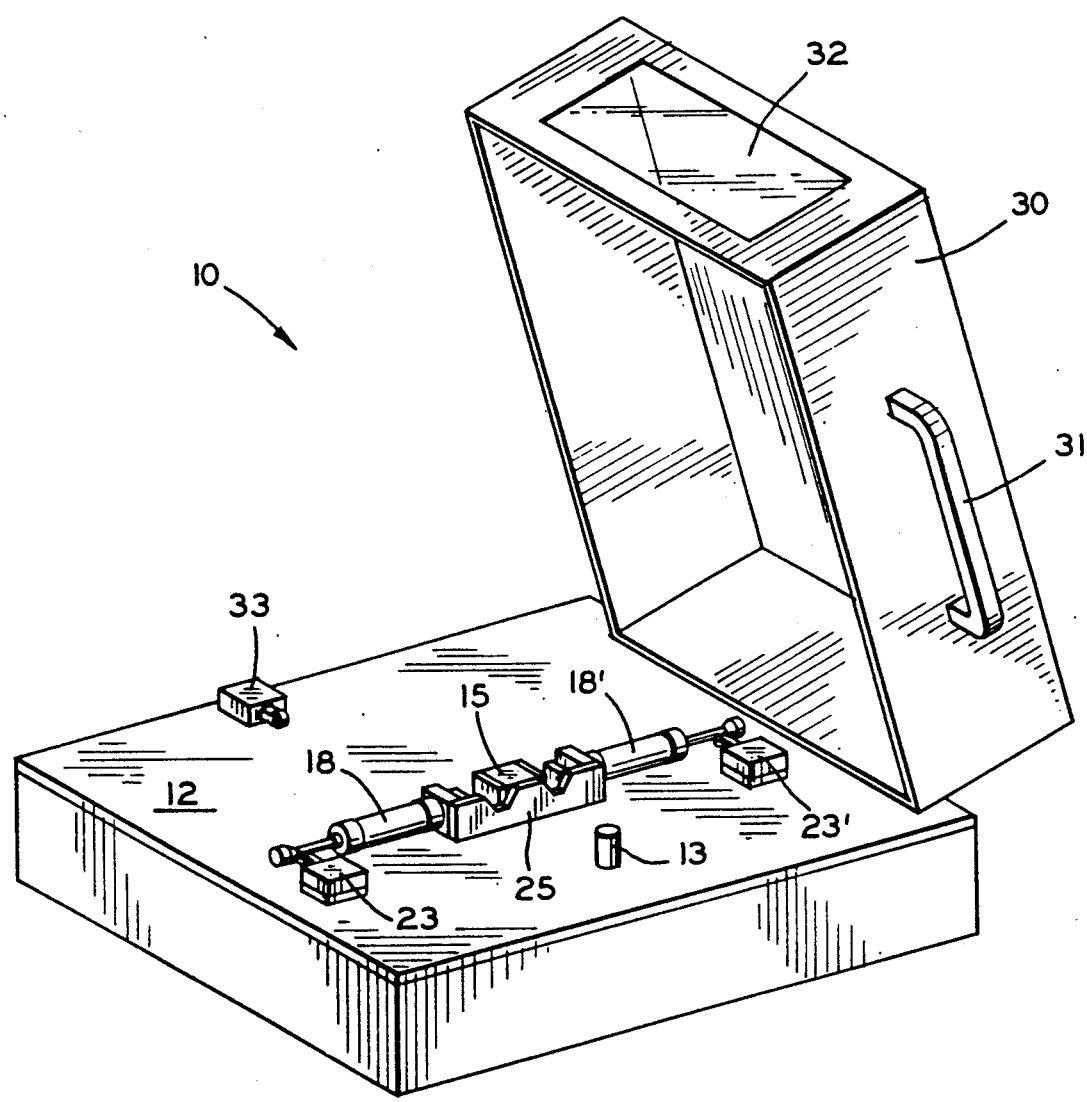
FIG. 1 is a perspective view of an improved resistance bonding in accordance with this invention.
Figure 2:
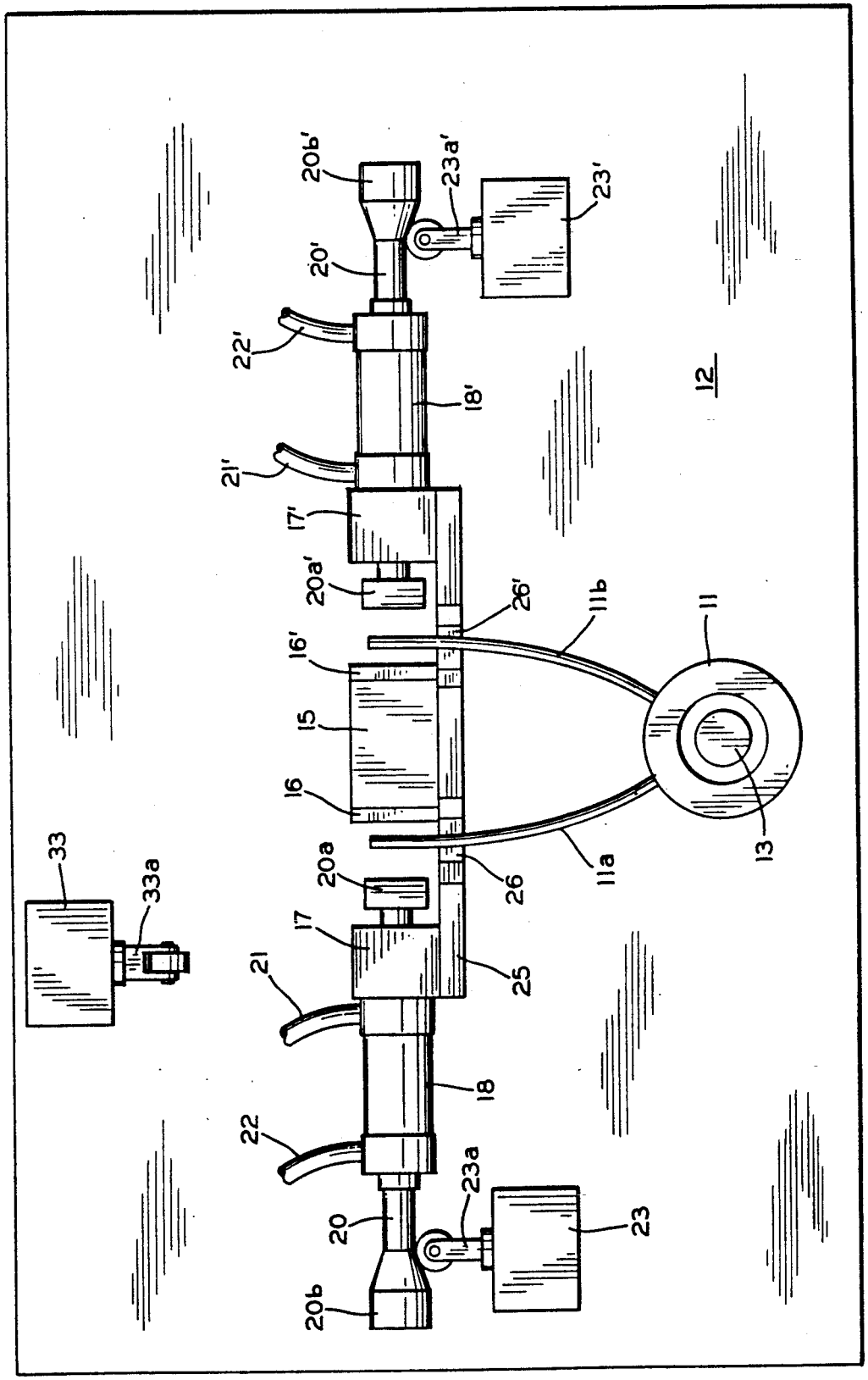
FIG. 2 is a top plan view of the apparatus shown in FIG. 1 with a ceil installed thereon prior to the beginning of the bonding operation.
Figure 3:
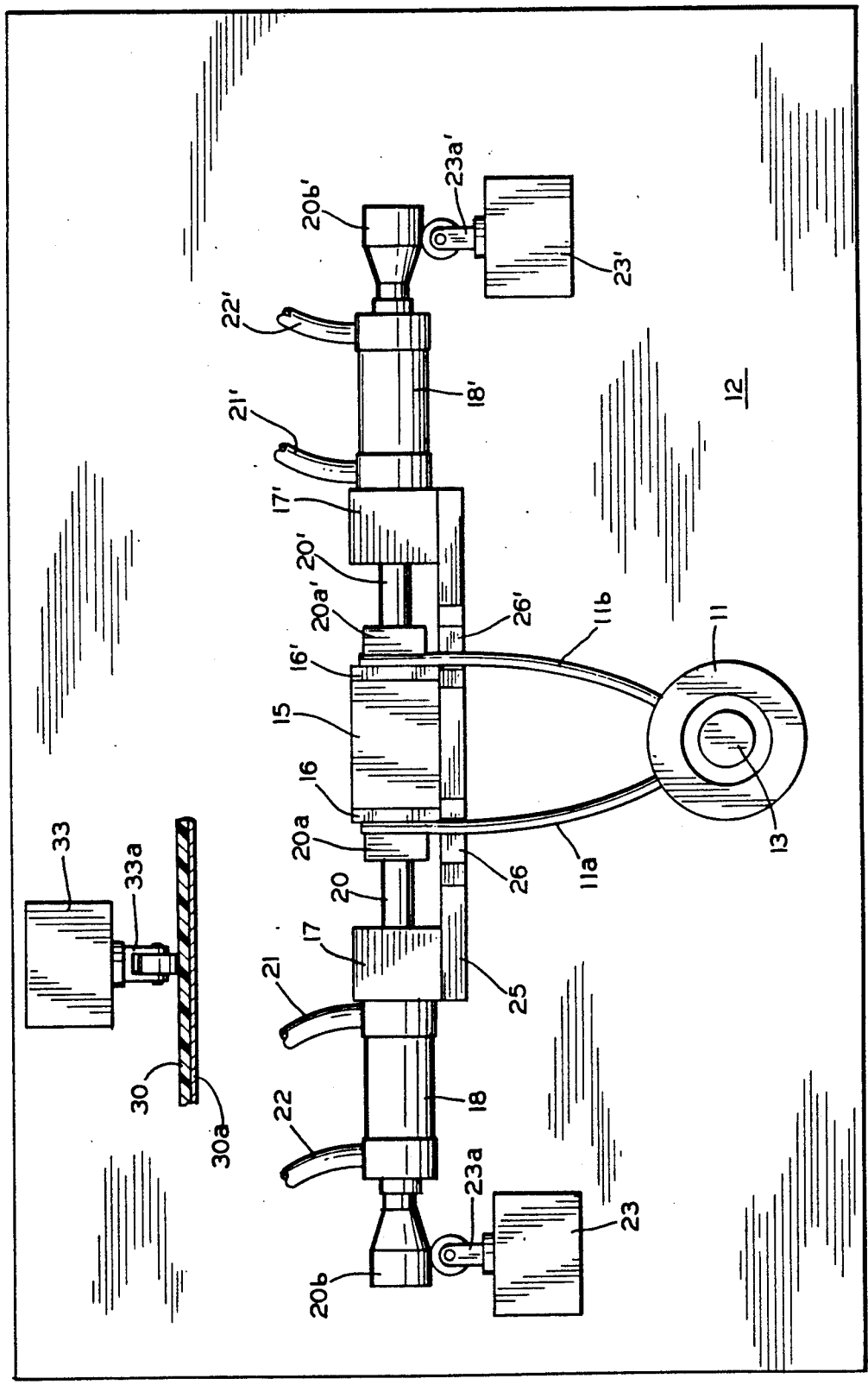
FIG. 3 is a top plan view similar to FIG. 2 showing the cover and the resistance bonding operation in progress.

Referring now to the drawings, there is illustrated in FIGS. 1 through 3 an improved resistance bonding apparatus, indicated generally at 10, in accordance with this invention. As will be explained in greater detail below, the apparatus 10 is used to perform a resistance bonding operation on an electromagnetic coil 11 having a pair of leads 11a and 11b extending therefrom. The apparatus 10 is mounted on a support surface 12 which is formed from an electrically non-conductive material. An upstanding post 13, also formed from an electrically non-conductive material, is secured to the support surface 12. As shown in FIGS. 2 and 3, the coil 11 is disposed about the post 13 during the resistance bonding operation to prevent movement thereof while the electric current is passed therethrough.

A first mounting block 15 is secured to the support surface 12. The first mounting block 15 is formed from an electrically non-conductive material and has a first metallic terminal 16 secured to one side thereof. A second mounting block 17 is also secured to the support surface 12. A pneumatic cylinder 18 is secured to the second mounting block 17. The cylinder 18 contains a movable piston 20, one end of which extends through an aperture (not shown) formed through the second mounting block 17. This end of the piston 20 terminates in an enlarged head portion 20a located adjacent to the terminal 16. The other end of the piston 20 terminates in an enlarged tapered tail portion 20b.

A pair of air hoses 21 and 22 are provided for selectively introducing pressurized air within the internal chambers (not shown) of the cylinder 18 and thereby moving the piston 20 relative thereto in a well known manner. As 0 best shown in FIG. 2, movement of the piston 20 in a first direction (toward the right when viewing FIGS. 2 and 3) causes the head portion 20a to engage the terminal 16. Movement in a second direction (toward the left when viewing FIGS. 2 and 3) causes the head portion 20a to move away from the terminal 16.

As the piston 20 is moved, the tail portion 20b thereof selectively engages a plunger 23a of a first limit switch 23. The limit switch 23 is conventional in the art and is adapted to generate an electrical signal when the piston 20 is moved toward the right and, as a result, the head portion 20a engages the terminal 16 as shown in FIG. 3. The electrical signal generated by the first limit switch 23 is discontinued when the piston 20 is moved toward the left, as shown in FIG. 2.

An upstanding positioning bracket 25 is secured to the support surface 12 and extends between the first and second mounting blocks 15 and 17. The positioning bracket 25 has a first generally V-shaped notch 26 formed therein which is aligned the space between the terminal 16 and the head portion 20a of the piston 20. As shown in FIG. 2, when the first lead 11a of the coil 11 is disposed within the notch 26 of the positioning bracket 25, it is automatically positioned to be engaged and retained between the head portion 20a and the terminal 16 when the piston 20 is moved toward the right. The positioning bracket 25 also supports the first lead 11a above the support surface 12 during the resistance bonding operation.

A second metallic terminal 16' is secured to the side of the first mounting block 15 opposite to the side to which the first terminal 16 is secured. A third mounting block 17' is secured to the support surface 12, and a second pneumatic cylinder 18', is supported thereon. The second cylinder 18' includes a movable piston 20'. Air hoses 21' and 22' are provided for selectively moving the piston 20' relative to the cylinder 18'. A second limit switch 23' is provided for generating an electrical signal when the piston 20' is moved toward the left so as to engage and retain the second lead 11b of the coil with the second terminal 16'. The positioning bracket 25 has a second generally V-shaped notch 26' formed therein for positioning and supporting the lead 11b as described above.

A protective cover 30 is pivotably mounted on the support surface 12. The cover 30 includes a handle 31 which can be conveniently grasped by an operator for moving the cover 30 relative to the support surface 12. The cover 30 is movable from an opened position (illustrated in FIGS. 1 and 2), wherein the various components of the apparatus 10 described above are exposed to the operator, to a closed position (illustrated in FIG. 3), wherein such components are covered. A transparent window 32 may be provided in a portion of the cover 30 to permit the operator to view the apparatus 10 when the cover 30 is closed. A third limit switch 33 is secured to the support surface 12. The third limit switch 33 includes a plunger 33a which is engaged by a portion of the cover 30 when the cover 30 is in the closed position. The third limit switch 33 is adapted to generate an electrical signal when the cover 30 is closed, for reasons which will be explained below.

Figure 4:
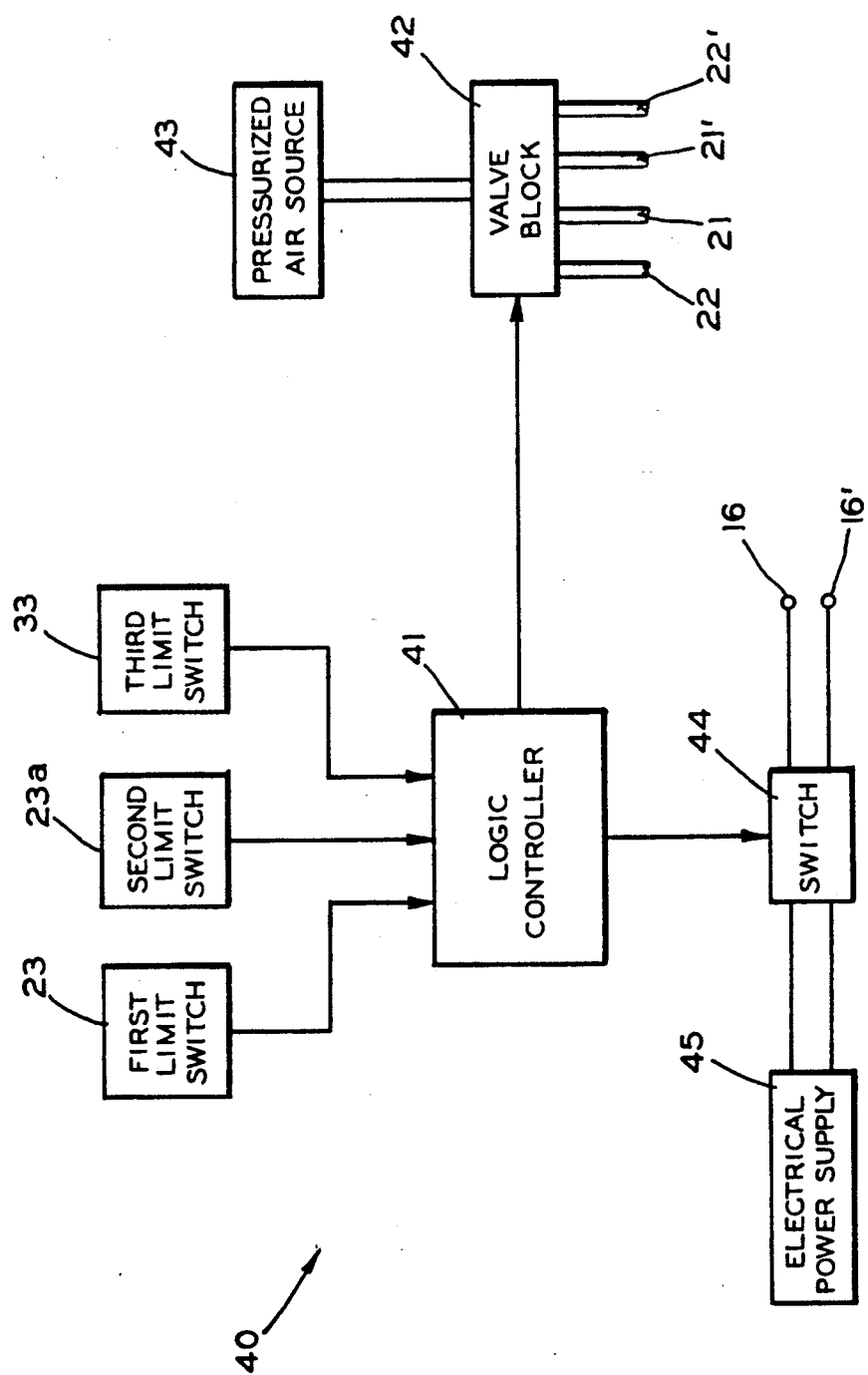
FIG. 4 is a diagram of a control circuit for the resistance apparatus.

A block diagram of a control circuit, indicated generally at 40, for the resistance bonding apparatus 10 is illustrated in FIG. 4. As shown therein, the control circuit 40 includes a logic controller 41 which receives the electrical signals generated by the first, second, and third limit switches 23, 23a, and 33, respectively. The logic controller 41 is responsive to such signals for controlling the operation of a valve block 42. The valve block 42 is connected between a source of pressurized air 43 and the air lines 21, 22 and 21', 22' from the cylinders 18 and 18', respectively. As will be explained in greater detail below, the logic controller 41 selectively provides 0 fluid communication between the source of pressurized air 43 and the air lines 21, 22 and 21', 22' for moving the pistons 20 and 20' toward the right and left.

The logic controller 41 is also responsive to the electrical signals generated by the first, second, and 35 third limit switches 23, 23a, and 33, respectively for controlling the operation of an electrical switch 44. The switch 44 is connected between an electrical power supply 45 and the terminals 16 and 16'. As will be explained in greater detail below, the logic controller 41 selectively opens and closes the switch 44 to complete an electrical circuit between the electrical power supply 45 and the terminals 16 and 16'.

Although the internal structure of the logic controller 41 is not shown, it will be appreciated that any one of a number of commonly known controller devices may be used to form the logic controller 41. The set up and arrangement of such a device, based upon the functions described below, is clearly within the scope of knowledge of a person having ordinary skill in this art. Also, a manually operable safety cut off switch (not shown) may be provided in the control circuit 40 for immediately cutting off all power thereto in an emergency situation.

The operation of the apparatus 10 will now be explained in detail. Initially, the cover 30 is opened by the operator using the handle 31. The opening of the cover 30 causes the third limit switch 33 to discontinue generating its signal to the logic controller 41. The logic controller 41 is responsive to the absence of this signal for opening the switch 44 (if it is not already opened, as described below). As a result, the power supply 45 is disconnected from the terminals 16 and 16'. This prevents the operator from accidentally receiving a shock by inadvertently touching one of the terminals 16 or 16' while the cover 30 is opened. The logic controller 41 also generates appropriate signals to the valve block 42 to move the pistons 20 and 20' to the retracted positions shown in FIG. 2.

Once the cover 30 is opened, the operator places a coil 11 to be resistance bonded about the post 13 and bends the leads 11a and 11b thereof so as to extend through the notches 26 and 26' between the terminals 16 and 16' and the respective piston head portions 20a and 20a. Once the leads 11a and 11b are oriented in this manner, the operator closes the cover 30, thereby enclosing the entire apparatus 10 and the coil 11. As shown in FIG. 3, the closing of the cover 30 causes the third limit switch 33 to generate an electrical signal to the logic controller 41. In response thereto, the logic controller 41 generates appropriate electrical signals to the valve block 42 to move the pistons 20 and 20' to the extended position shown in FIG. 2. Consequently, the leads 11a and 11b are securely clamped to the terminals 16 and 16', respectively, by the piston head portions 20a and 20a'.

When the pistons 20 and 20' are moved to their extended positions, the first and second limit switches 23 and 23, are actuated (by virtue of their engagement with the tail portions 20b and 20b, of the pistons 20 and 20') so as to generate their electrical signals to the logic controller 41. The logic controller 41 is responsive to the generation of both of such signals so as to generate an appropriate signal to the switch 44, causing it to close. As a result, the power supply 45 is connected to the terminals 16 and 16' and, therefore, to the leads 11a and 11b of the coil 11.

This connection causes an electrical current to pass through the coil 11, thereby resistance bonding the coil 11 as described above. The time duration of this connection is preferably predetermined and controlled by an adjustable timer circuit within the logic controller 41. When this time duration expires, the logic controller 41 causes the switch 44 to open, thereby disconnecting the terminals 16 and 16' from the power supply 45. Then, the logic controller 41 automatically moves the pistons 20 and 20' to their retracted positions, thereby releasing the leads 11a and 11b. Of course, if the cover 30 is opened during the resistance bonding operation, the logic controller 41 (in response to the disruption of the signal from the third limit switch 33) would cause the switch 44 to immediately open and the pistons 20 and 20' to be retracted.

Thus, it can be seen that the cover 30 performs several functions. First, as described above, the closing of the cover 30 automatically starts the entire resistance bonding operation, including clamping the leads 11a and 11b to the terminals 16 and 16' and connecting the terminals 16 and 16' to the power supply 45. This automatic operation is much quicker and easier than a conventional manually operated apparatus. Second, the cover 30 functions to protect the operator from accidental electrical shock resulting from inadvertent contact with the terminals 16 and 16', since the terminals 16 and 16' are automatically disconnected from the power supply 45 while the cover 30 is opened.

The cover 30 may also serve to shield the operator from any potential adverse effects resulting from the electromagnetic field which is generated by the coil 11 during the resistance bonding operation. As shown in FIG. 3, the cover 30 may be lined with a shielding material 30a which contains such electromagnetic field within the cover 30. This shielding material 30a may be a sheet of metallic foil which lines the top and sides of the cover 30. Similar shielding material is placed beneath the support surface 12. The nature and thickness of the shielding material 30a is dependent upon the magnitude of the electromagnetic field which is generated by the coil 11 which, in turn, is dependent upon the numbers of windings in the coil 11 and the amount of electrical current passed therethrough. If a window 31 is provided in the cover 30, may be desirable to increase the thickness of the shielding material 30a adjacent thereto. This increased thickness diverts more of the magnetic flux into the shielding material 30a and thereby reduces the amount of such flux which would otherwise pass through the window 31. In any event, the nature and thickness of such shielding material 30a can be determined through known calculations.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for performing a resistance bonding operation on an electromagnetic coil having a lead extending therefrom comprising:

a terminal adapted to be connected to a source of electrical power;

means for selectively connecting the lead of the coil to said terminal;

a cover movable between an opened position and a closed position; and means responsive to the position of said cover for actuating said connecting means to connect the lead to said terminal when said cover is closed.

2. The apparatus defined in claim 1 wherein said lead connecting means includes a cylinder having a piston, said piston being movable between an extended position, wherein the lead is connected to said terminal, and a retracted position, wherein the lead is not connected to said terminal.

3. The apparatus defined in claim 2 wherein said lead connecting means further includes a source of pressurized air and means for selectively connecting said source of pressurized air to said cylinder for moving said piston between said extended and retracted positions.

4. The apparatus defined in claim 3 wherein said means for selectively connecting said source of pressurized air to said cylinder includes valve means connected between said source of pressurized air and said cylinder.

5. The apparatus defined in claim 1 wherein said actuating means includes a limit switch which is engaged by said cover when said cover is closed and which generates a signal in response thereto.

6. The apparatus defined in claim 5 wherein said actuating means further includes logic controller means for actuating said connecting means to connect the lead to said terminal in response to said signal.

7. The apparatus defined in claim 6 wherein said connecting means includes a cylinder having a piston, said piston being movable between an extended position, wherein the lead is clamped to said terminal, and a retracted position, wherein the lead is released from said terminal.

8. The apparatus defined in claim 7 wherein said connecting means further includes a source of pressurized air and means for selectively connecting said source of pressurized air to said cylinder for moving said piston between said extended and retracted positions, said means for selectively connecting said source of pressurized air to said cylinder being actuated by said logic controller means.

9. The apparatus defined in claim 8 wherein said means for selectively connecting said source of pressurized air to said cylinder includes valve means connected between said source of pressurized air and said cylinder.

10. An apparatus for performing a resistance bonding operation on an electromagnetic coil having a lead extending therefrom comprising:

a terminal adapted to be connected to the lead of the coil;

a source of electrical power;

switch means for selectively connecting said terminal to said source of electrical power;

cover movable between an opened position and a closed position; and means responsive to the position of said cover for actuating said switch means to connect said terminal to said source of electrical power when said cover is closed.

11. The apparatus defined in claim 10 wherein said actuating means includes a limit switch which is engaged by said cover when said cover is closed and which generates a signal in response thereto.

12. The apparatus defined in claim 11 wherein said actuating means further includes logic controller means for actuating said switch means to connect said terminal to said source of electrical power in response to said signal.

13. The apparatus defined in claim 10 further including means for selectively connecting the lead of the coil to said terminal.

14. The apparatus defined in claim 13 wherein said connecting means includes a cylinder having a piston, said piston being movable between an extended position, wherein the lead is clamped to said terminal, and a retracted position, wherein the lead is released from said terminal.

15. The apparatus defined in claim 14 further including a limit switch which is engaged by said piston when said piston is moved to its extended position and which generates a signal in response thereto.

16. The apparatus defined in claim 15 further including logic controller means for actuating said switch means to connect said terminal to said source of electrical power in response to said signal.

17. An apparatus for performing a resistance bonding operation on an electromagnetic coil having a lead extending therefrom comprising:

a terminal adapted to be connected to a source of electrical power;

means for selectively connecting the lead of the coil to said terminal; and a cover movable between an opened position and a closed position, said cover covering said terminal and said connecting means when in said closed position.

18. The apparatus defined in claim 17 wherein said cover includes shielding material for containing an electromagnetic field generated by the coil within said cover.

19. The apparatus defined in claim 18 wherein said shielding material includes metallic foil.

20. The apparatus defined in claim 17 further including a transparent window provided in said cover.

21. The apparatus defined in claim 20 wherein said cover includes shielding material for containing an electromagnetic field generated by the coil within said cover, the thickness of said shielding material being greater adjacent said window than throughout the rest of said cover.

* * * * *